United States Patent Office 3,669,717
Patented June 13, 1972

3,669,717
METHOD OF COATING SHAPED ARTICLES OF PLASTICIZED POLYVINYL CHLORIDE
Akira Akamatsu and Kazushi Togo, Kanagawa-ken, and Yoko Kida, Tokyo, Japan, assignors to Ajinomoto Co., Inc., Tokyo, Japan
Filed Sept. 23, 1970, Ser. No. 74,832
Claims priority, application Japan, Sept. 30, 1969, 44/77,921
Int. Cl. B32b 27/30; B44d 1/14
U.S. Cl. 117—72
6 Claims

ABSTRACT OF THE DISCLOSURE

The tendency of plasticized PVC surfaces to become tacky because of plasticizer migration is remedied by a coating essentially consisting of poly-γ-alkyl glutamate held to the PVC surface by a primer coating of homopolymers or copolymers of PVC having a low degree of polymerization (500 or less).

---

This invention relates to a surface treatment for objects mainly consisting of plasticized polyvinyl chloride (PVC), and particularly to a process for coating such articles so as to prevent their surfaces from becoming tacky.

The surface of plasticized PVC often becomes tacky because of plasticizer migration. This was prevented heretofore by coating the PVC object with resin solutions, such as those of acrylic ester polymers, polyvinyl acetate, modified polyamides, or polyurethanes. The known coatings are not entirely satisfactory because of inadequate resistance to heat, weather, or solvents, and because of their touch.

Coating solutions based on polyamino acids, particularly poly-γ-alkyl glutamates, prevent tackiness without the aforementioned unsatisfactory features. A poly-γ-alkyl glutamate coating resembles natural leather in appearance and touch, while being free from tackiness in a combination of properties not otherwise available.

However, the coating produced by applying a solution of the poly-γ-alkyl glutamate to the PVC surface adheres poorly, and this is particularly evident when the substrate is a PVC film or sheet, such as imitation leather based on PVC, which is subjected to stretching, twisting, and rubbing in normal use.

Laminating PVC with an adhesively fastened film of alkyl poly-γ-glutamate is also unsatisfactory because few adhesives are suitable, the otherwise excellent solvent resistance of the polyglutamate films is impaired by the adhesives, the laminating process is complex and therefore uneconomical, and the available adhesives form layers too thick and too hard to be suitable for use on a soft, sponge-like PVC base.

It has now been found that a polyglutamate coating of satisfactory adhesion can be applied to PVC over a primer coating deposited from an organic solvent containing a dissolved vinyl chloride homopolymer or copolymer of low molecular weight. The primer solution penetrates the PVC surface by diffusion and prevents plasticizer migration to the surface. The adhesion of the subsequently applied poly-γ-alkyl glutamate coating is strong enough to resist abrasion and repeated stretching or twisting of the substrate.

The appearance, touch, weather resistance, heat resistance, and solvent resistance of the laminar coating are excellent, and the coating of the invention is applied successfully to sponge-like imitation leather of plasticized PVC.

The plasticized PVC bodies to which the coating of the invention is applied may be prepared from a granular or other resin composition by calendering, extrusion, or injection molding, and the composition may contain, as plasticizers, esters of dibasic organic acids or of phosphoric acid, derivatives of castor oil, epoxidized vegetable oils, ethylene glycol derivatives, polyesters, chlorinated paraffin, or chlorinated fatty acid esters, and all the usual other compounding ingredients (stabilizers, fillers, lubricants, pigments, blowing agents). The PVC bodies may also be shaped from PVC latex, plastisols and organosols by coating, dipping, vacuum molding, slush molding, or rotational molding without interfering with the effectiveness of the coating applied according to this invention.

The degree of polymerization (D.P.) of the homopolymer or copolymer of vinyl chloride in the primer solution must be low enough to make the polymer soluble in the solvent employed. PVC having a D.P. of less than 500 is readily soluble in organic solvents, and the solubility of copolymers in which the vinyl chloride units are dominant is better at such a low D.P.

Repeating units other than those of vinyl chloride in the copolymers may be radicals of vinyl acetate, vinyl propionate, vinyl esters of higher alkanoic acids, acrylic and methacrylic esters, vinyl ether, maleic anhydride, maleic esters, vinylidene chloride, or acrylonitrile. The copolymers may contain one or more types of repeating units other than those of vinyl chloride.

The primer coatings deposited from solutions of the copolymers in organic solvents generally produce better adhesion than those prepared from homopolymer solutions. Suitable vinyl chloride copolymers are available under the following trade names or trademarks from the suppliers listed: Kanevilac L–D and L–G (Kanegafuchi Chemical Industries Co., Ltd.), Shin-etsa Vinilac T, E, A, O, and B (The Shin-etsu Chemical Industry Co., Ltd.), Denka Vinyl MM 40 (Denki, Kagaku Kogyo K. R.), Geon 400x150M, 400x150ML, 400x150L, 400x110A, 427TS, 309M (Japanese Geon Co., Ltd.), and others. The homopolymers and copolymers of vinyl chloride may also be mixed in any ratio.

The solvents employed should be capable of dissolving more than 0.6 g. polymer per 100 g. solvent, but are otherwise not limited. Solvents having a boiling point below 150° C. are preferred for easy drying of the primer coating. Suitable organic solvents include ketones, such as acetone, methyl ethyl ketone, and methyl isobutyl ketone; cyclic ethers, such as dioxane and tetrahydrofuran; aromatic hydrocarbons, such as benzene and toluene; chlorinated hydrocarbons, such as methylene chloride, chloroform, 1,2-dichloroethane, 1,1,2-trichloroethane, 1,1,1-trichloroethane, 1,2-dichloropropane; ethyl acetate; and mixtures of these solvents.

The primer solution should be applied at a concentration and rate to deposit 0.2–3.0 g. of solids per square meter of treated PVC surface. At a lower deposition rate, a subsequently applied coating mainly consisting of poly-γ-alkyl glutamate adheres poorly. The desirable touch and softness are lost when the primer deposit exceeds 3.0 g./m.². A deposit of 0.5 to 1.2 g./m.² is preferred.

Correspondingly, the solids content of the primer solution may be about 0.6 g. to 15 g. per 100 g. of solution, but may be varied depending on the application method, such as brushing, spraying, gravure coating, roller coating, or dip coating.

The top layer of poly-γ-alkyl glutamate may be deposited from a solution which contains additives such as other macromolecular compounds, plasticizers, antistatic agents, coloring agents, or flame retardants.

The poly-γ-alkyl glutamate which is the main component of the top or surface layer may be a homopolymer, such as poly-γ-methyl glutamate, poly-γ-ethylglutamate, poly-γ-propylglutamate, poly-γ-butyl glutamate, a poly-γ-alkyl glutamate having a higher alkyl group, or a copolymer containing repeating units of different γ-alkyl esters in the same molecule or of different optical isomers. Examples are the copolymers of γ-butyl-D-glutamate with γ-methyl-D-glutamate and γ-methyl-D-glutamate with γ-methyl-L-glutamate.

Suitable other macromolecular compounds include elastomers such as polybutene, natural rubber, polychloroprene, acrylonitrile-butadiene copolymer, polybutadiene, chlorosulfonated polyethylene, polyvinyl acetate, vinyl chloride-vinyl acetate copolymer, polyalkyl acrylate, polyalkyl methacrylate, and urethane prepolymers.

Poly-γ-alkyl glutamate may be modified with polyurethane resin having terminal active isocyanate groups. Organic solvents which dissolve the above poly-γ-alkyl-glutamate include chlorinated hydrocarbons such as methylene chloride, chloroform, 1,2-dichloroethane, 1,1,2-trichloroethane, 1,1,1 - trichloroethane, tetrachloroethane, 1,2-dichloropropane; dimethylformamide, dimethylacetamide, acetonitrile, methyl ethyl ketone, cyclohexanone, toluene, ethyl acetate, perchloroethylene, and mixtures of these compounds.

The surface layer is applied preferably after the primer has dried. Applying methods are adopted according to the viscosity of the surface coating solution and include brushing, spraying, gravure coating, roll coating, knife coating and dip coating.

The following examples are further illustrative of the present invention:

EXAMPLE 1

Plasticized polyvinyl chloride sheet composed of 100 parts of polyvinyl chloride powder (Geon 103EP), 50 parts of dioctyl phthalate, 5 parts of di-2-ethylhexyl azelate, 15 parts of NBR (Hycar–1411), 2 parts of barium-cadmium compound soap (KV–56), 3 parts of epoxy substabilizer (Adecacizer-o–120), and 2 parts of coloring agent (Finess 30 Black H) was prepared on a calender and laminated in a thickness of 1 mm. on a knitted fabric of staple fiber. Then, a primer of 100 parts of tetrahydrofuran and 2.5 parts of "Denka Vinyl MM–40" was brushed on the laminated fabric and dried at room temperature for 10 minutes. The amount of primer solid per 1 m.$^2$ of the vinyl leather cloth was 0.88 g.

A surface coating solution of 5 parts of poly-γ-methyl-L-glutamate, 66.5 parts of 1,2-dichloroethane and 28.5 parts of perchloroethylene was applied from an applicator of 0.3 mm. slit width, and dried in hot air at 130° C. for 4 minutes. The dried cloth was embossed with an embossing roller. A vinyl leather cloth of pleasant touch was obtained.

In a tackiness test and a rubbing test (5,000 cycles) according to Japanese Industrial Standards K–6772, no change was observed. The coating of the cloth did not come off in which intersecting cuts were made in the surface at an angle of 30° with a single-edged razor and the razor's edge was inserted at the acute angles.

For the purpose of comparison, a vinyl leather cloth was prepared in the same manner as above but without the primer. The surface coating of poly-γmethylglutamate was easily peeled off at a crack which formed during embossing.

EXAMPLE 2

Polyvinyl chloride paste consisting of 100 parts of polyvinyl chloride powder (Geon 121), 50 parts of dioctyl phthalate, 50 parts of epoxidized soybean oil (Adecacizer-o–130), 5 parts of dibasic lead phosphite, 4 parts of titanium white, 10 parts of a foaming agent and 7 parts of viscosity increasing agent was spread on a knitted fabric of staple fiber in a thickness of about 1 mm. with a knife coater. Then the fabric was heated for gelation and foaming of the base-coating.

After cooling, a primer of 80 parts of methyl ethyl ketone, 10 parts of toluene, 10 parts of ethyl acetate and 1 part of Geon 400 x 110A was applied with a gravure coater. The primed fabric was passed through a hot-air dried of 150° C. for 30 seconds. The primer solids amounted to 0.41 g./m.$^2$.

On this artificial leather, a surface coat of 7 parts of poly-γ-ethyl-D-glutamate, 3 parts of polymethyl acrylate, 133 parts of 1,2-dichloroethane, 38 parts of perchloroethylene, 19 parts of toluene and 3 parts of a white coloring agent was applied with a gravure coater. The treated leather was dried in air at 150° C. for one minute.

The product was similar in appearance and touch to natural leather, and the adherence to the surface coating was strong. There was found no change in a tackiness test, a rubbing test according to JIS–K–6772 and an adhesion test with a knife.

EXAMPLE 3

Plasticized polyvinyl chloride obtained by compounding 100 parts of polyvinyl chloride powder (Geon 130EP), 15 parts of dioctyl phthalate, 15 parts of butyl-benzyl phthalate, 1.5 parts of barium-cadmium compound stabilizer and 2 parts of a red coloring agent was extruded and molded into a sheet having 1.5 mm. thickness. A primer of 80 parts of 1,2-dichloroethane, 20 parts of toluene, 3 parts of Vinilite VYHH and 1 part of Geon 427 TS was brushed on both sides of the sheet and air-dried. The amount of resin on each side of the polyvinyl chloride sheet was 0.72 g./m.$^2$.

A solution of 3 parts of γ-ethyl-L-glutamate-DL-alanine copolymer 9:1, 69 parts of 1,2-dichloroethane and 28 parts of dimethylformamide was sprayed uniformly on the sheet. The coated sheet was dried in ambient air and then in hot air at 100° C. for 20 minutes.

The coated surface was uniform, lustrous, and pleasant to touch. Adherence of the surface coating was strong, and it was satisfactory in a tackiness test, a rubbing test according to JIS–K–6772 and an adhesion test with a knife.

EXAMPLE 4

A plastisol of 80 parts of polyvinyl chloride powder (Geon 121), 20 parts of Geon 163ZX, 50 parts of dioctyl phthalate, 50 parts of polyester plasticizer (Paraplex G–50), 10 parts of calcium carbonate and 1 part of dibutyl tin laurate was applied to a glass plate in a thickness of 1 mm. and heated to gel. A sheet was peeled from the glass plate.

On this sheet, a primer of 100 parts of ethyl acetate and 6 parts of Shin-etsu Vinilac E was sprayed uniformly and air-dried. The amount of resin was 0.94 g./m.$^2$. Then a surface coating solution of 4 parts of γ-methyl-D-glutamate-γ-2-ethylhexyl-D-glutamate copolymer 64:36, 38 parts of methyl ethyl ketone, 24 parts of toluene, 19 parts of 1,2-dichloroethane and 15 parts of cyclohexanol was sprayed uniformly on the sheet with an air gun and air-dried.

The finished sheet had a smooth surface with the dry touch. Adherence of the surface coating was strong, and it was satisfactory in a tackiness test, a rubbing test according to JIS–K–6772 and an adhesion test with a knife.

What we claim is:

1. A method of coating the surface of a shaped article of plasticized polyvinyl chloride which comprises:
   (a) applying to said surface a primer solution essentially consisting of an organic solvent and of a vinyl polymer having a degree of polymerization of less than 50, said polymer being dissolved in said solvent, wherein the predominant repeating units of said polymer are radicals of vinyl chloride;
   (b) removing said solvent from the applied solution, wherein the amount of said primer solution is sufficient to make the weight of the applied primer after removal of said solvent 0.2 to 3.0 grams per square meter; and
   (c) coating the primed surface with a top layer of a resin composition comprising poly-γ-lower-alkyl glutamate as the main component.

2. A method as set forth in claim 1, wherein said polymer is polyvinyl chloride or a copolymer of vinyl chloride with at least one member of the group consisting of vinyl esters of lower alkanoic and alkenoic acids, vinyl ether, maleic anhydride, maleic acid esters, vinylidene chloride, and acrylonitrile.

3. A method as set forth in claim 1, wherein said organic solvent essentially consists of at least one member of the group consisting of ketones, cyclic ethers, aromatic hydrocarbons, chlorinated hydrocarbons and lower alkyl esters of lower alkanoic acids, said solvent being normally liquid, and having a boiling point of less than 150° C., said polymer being dissolved in said solvent in an amount of at least 0.6 percent by weight.

4. A method as set forth in claim 1, wherein the solids content of said primer solution is between 0.6 and 15 percent by weight.

5. A method as set forth in claim 1, wherein said top layer additionally contains an elastomer.

6. A method as set forth in claim 1, wherein said primed surface is coated with said top layer by applying to the surface a solution of said resin composition in an organic solvent, and removing the solvent of the last-applied solution.

References Cited

UNITED STATES PATENTS

| | | | |
|---|---|---|---|
| 2,561,323 | 7/1951 | Waller et al. | 260—482 P |
| 3,108,899 | 10/1963 | Reindl et al | 117—76 F |
| 3,149,997 | 9/1964 | Tamburro | 117—76 F |
| 3,364,060 | 1/1968 | Welzel et al. | 117—76 T |
| 3,416,948 | 12/1968 | Mavrer | 117—76 T |

FOREIGN PATENTS

| | | | |
|---|---|---|---|
| 2,750 | 3/1963 | Japan | 260—482 P |

RALPH HUSACK, Primary Examiner

U.S. Cl. X.R.

117—11, 68, 76 F, T, 77, 80, 81, 83, 138.8 UA, 164